US008518265B2

(12) United States Patent
Kohno et al.

(10) Patent No.: US 8,518,265 B2
(45) Date of Patent: Aug. 27, 2013

(54) FUNCTIONAL POWDER AND WATER TREATMENT METHOD EMPLOYING THE SAME

(75) Inventors: Tatsuoki Kohno, Tokyo (JP); Akiko Suzuki, Tokyo (JP); Shinji Murai, Sagamihara (JP); Ichiro Tai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 279 days.

(21) Appl. No.: 12/562,708

(22) Filed: Sep. 18, 2009

(65) Prior Publication Data

US 2010/0072138 A1 Mar. 25, 2010

(30) Foreign Application Priority Data

Sep. 25, 2008 (JP) ................................. 2008-246102

(51) Int. Cl.
*B01D 35/06* (2006.01)
*B01J 20/02* (2006.01)

(52) U.S. Cl.
USPC .......................................... 210/695; 502/406

(58) Field of Classification Search
USPC ........................ 210/695; 502/406
See application file for complete search history.

(56) References Cited

U.S. PATENT DOCUMENTS

2007/0172426 A1* 7/2007 Lee et al. ..................... 424/9.32
2008/0089836 A1* 4/2008 Hainfeld ...................... 424/1.11

FOREIGN PATENT DOCUMENTS

JP    2000-176306    6/2000

OTHER PUBLICATIONS

U.S. Appl. No. 12/405,430, filed Mar. 17, 2009, Murai, et al.
Notification of Reasons for Rejection issued Jan. 27, 2012 in Japanese Patent Application No. 2008-246102 (with English translation).

* cited by examiner

*Primary Examiner* — Chester Barry
(74) *Attorney, Agent, or Firm* — Oblon, Spivak, McClelland, Maier & Neustadt, L.L.P.

(57) ABSTRACT

The present invention provides a functional powder capable of effectively adsorbing impurities in water treatment. The powder can be rapidly separated by use of magnetic force, and hence is excellent in workability. This functional powder comprises magnetic particles having surfaces modified with hydrophobic groups and hydrophilic groups loaded thereon. The hydrophobic groups have a function of adsorbing the impurities, and the hydrophilic groups have a function of dispersing the powder stably in water. The numbers M and N of the hydrophobic groups and the hydrophilic groups, respectively, satisfy the condition of $0.2 < M/N < 0.8$, so that the adsorbability to impurities and the dispersion stability are both ensured.

15 Claims, No Drawings

FUNCTIONAL POWDER AND WATER TREATMENT METHOD EMPLOYING THE SAME

CROSS-REFERENCE TO RELATED APPLICATIONS

This application is based upon and claims the benefit of priority from the prior Japanese Patent Application No. 2008-246102, filed on Sep. 25, 2008; the entire contents of which are incorporated herein by reference.

BACKGROUND OF THE INVENTION

1. Field of the Invention

The present invention relates to a functional powder advantageously used for water purification or for solid-liquid separation. This invention particularly relates to a functional powder with which substances to separate are combined to be caught and removed from raw water by use of magnetic separation technology.

2. Background Art

Recently, according as industries have been developed and the population has been increased, it has become desired to use water resources effectively. Accordingly, it has become very important to reuse abandoned water such as industrial wastewater. For the purpose of that, it is necessary to purify water, namely, to separate impurities from water. There are known various methods of separating impurities from water. Examples of the known separation methods include membrane separation, centrifugal separation, active carbon adsorption, and ozone treatment. Further, it is also known that floating substances can be removed by use of flocculants. Those methods can remove not only oils and/or clay dispersed in water but also eco-harmful chemicals such as phosphorus or nitrogen compounds contained in water. Among the above, the membrane separation is one of the most popularly used methods. However, if oils dispersed in water are removed with a membrane, pores of the membrane are often clogged with the oils and hence the working lifetime of the membrane is liable to shorten. The membrane separation is, therefore, often unsuitable for removing oils from water. When water is polluted with oils such as heavy oil, buoyancy of the oils can be exploited to remove them. For example, heavy oil floating on water surface is brought together with oil fences extended in the water and then sucked up to be recovered from the water surface, or otherwise heavy oil-adsorbent of hydrophobic material is spread on the water surface so that the heavy oil can be adsorbed and thereby recovered.

Meanwhile, there is known a water purification apparatus of solid-liquid separation type. The apparatus comprises a filter through which raw water is filtrated to separate and remove impurities such as organic substances or other foreign substances (which are hereinafter simply referred to as "impurities"). In the purification apparatus, the raw water is led to pass through the filter having fine pores. If the impurities have projected areas (or projected diameters) larger than the pores, they are caught by the filter and, as a result, water having passed through the filter is collected to obtain purified water. However, if this purification treatment is repeatedly carried out with the same filter, the caught impurities are gradually accumulated on the inlet side of the filter and accordingly pressure loss increases to lower the amount of filtrated water. In that case, it is necessary to stop the treatment and to pour purified water reversely so as to wash away and remove the accumulated impurities.

In the case where too fine impurities to remove with the filter must be separated, they are made to cohere with flocculants to form aggregations having enough sizes (namely, sizes of a few hundred micrometers) to catch by the filter and then the aggregations are removed with the filter. For example, flocculants such as aluminum sulfate and poly aluminum chloride are added into raw water to generate aluminum ions or the like in the raw water, and then the water is stirred to aggregate the impurities. Since the impurities cohere to become relatively large aggregations, they can be removed with the filter to obtain purified water having high quality. The separated impurities in the form of aggregations are treated as sludge, which is composted or otherwise is directly conveyed to a landfill site or an incineration plant.

However, the above filter-separation method has some problems to solve.

First, since washing water is made to flow reversely to wash away the impurities accumulated on the filter, the obtained sludge is a mixture of the impurities and the washing water. Accordingly, the sludge produced in the method generally contains a large amount of water. On the other hand, however, the sludge preferably contains water in an amount as small as possible to reduce the conveying cost whether it is composted or directly trucked to a landfill site or an incineration plant. The sludge is, therefore, generally drained with a drying or wringing device such as a spin-dryer or a belt-pressing machine. If the sludge contains water in a large amount, a device capable of draining a large amount of water is needed and hence it costs a lot to buy and run the device.

Further, when the above separation method is performed successively, the filtration process (in which the impurities are gradually accumulated on the filter) and the cleaning process (in which the impurities accumulated on the filter are washed away) must be alternatively repeated. This means that the filtration process must be periodically interrupted to lower the amount of treated water.

Furthermore, in order to treat a large amount of raw water, a large filter is required and hence the purification apparatus must be inevitably enlarged. In addition, from the viewpoint of cost, it is disadvantageous to use flocculants.

As described above, there is room for improvement in the filter-separation method.

JP-A 2000-176306 (KOKAI) discloses a method in which heavy oil is recovered by means of a magnetic separation apparatus. The disclosed method employs magnetic particles which are coated with hydrophobic layers and thereby which are made capable of adsorbing oils. In the method, first those oil-adsorbent particles are spread on raw water to adsorb impurities, namely, to catch heavy oil floating on water. The particles having adsorbed the heavy oil is then pumped up together with the water, and collected by means of a magnetic separation-purification apparatus to recover the heavy oil. Here, the "magnetic separation-purification apparatus" means a device with which the magnetic particles are collected and recovered by use of magnetic force.

The magnetic separation-purification apparatus thus separates and recovers the magnetic particles by use of magnetic force. In addition to the above process, the apparatus can be also used for another purification process. In the process, magnetic particles not coated with hydrophobic layers are added into raw water together with flocculants, so that the magnetic particles serve as nuclei and thereby non-magnetic substances contained in the water are made to cohere around the magnetic particles to form aggregations, which are then separated and recovered with the magnetic separation apparatus by use of magnetic force. In this way, even the magnetic particles not coated with hydrophobic layers can be separated and recovered by the magnetic separation process if only they are pretreated.

However, the present inventors have studied and found that there is still room for improvement. It is found that the magnetic particles coated with hydrophobic layers disclosed in the JP-A 2000-176306 (KOKAI) are insufficiently dispersed in raw water since they have hydrophobic surfaces. The insufficiently dispersed particles cannot adsorb the impurities sufficiently, and hence the impurities are liable to be removed insufficiently.

SUMMARY OF THE INVENTION

The present invention resides in a functional powder comprising;
magnetic particles, and
hydrophobic groups and hydrophilic groups are provided on the surfaces of the magnetic particles,
wherein the number M of said hydrophobic groups and the number N of said hydrophilic groups satisfy the condition of $0.2 < M/N < 0.8$.

The present invention also resides in a water treatment method, comprising:
dispersing said, functional powder in water containing impurities so that the impurities are adsorbed on the surface of the powder, and
removing the functional powder having adsorbed the impurities from the water by use of magnetic force.

The present invention provides a functional powder advantageously used for water treatment. The functional powder can efficiently adsorb impurities, particularly, organic foreign substances in raw water, and after adsorbing the impurities the powder can be rapidly removed/separated from the water by use of magnetic force. The functional powder of the present invention, therefore, is excellent in workability. Further, the present invention also provides a water treatment method of high efficiency and of low cost. In the water treatment method, the above functional powder is employed to adsorb foreign substances floating on raw water. Although the powder having adsorbed the impurities is dispersed evenly in the water, it is easy to gather the powder to one point by applying magnetic force. This means that the functional powder can be used not only for purifying water but also for recovering aimed substances floating on water.

The functional powder according to the present invention has high affinity to both water and oils (impurities) since hydrophobic groups and hydrophilic groups are both provided on the surface thereof. The hydrophobic (i.e., oleophilic) groups combine the impurities with the powder, and the hydrophilic groups have a function of dispersing the powder very stably in water. Consequently, the functional powder having adsorbed the impurities is stably dispersed in water to form a suspension, and hence the impurities can be effectively recovered by use of magnetic force. Further, the hydrophobic groups and the hydrophilic groups can be independently introduced into the functional powder of the present invention. This means that the ratio between the numbers of them can be freely controlled. Accordingly, it is possible to design the hydrophobicity or hydrophilicity of the powder optimally according to the aimed raw water.

DETAILED DESCRIPTION OF THE INVENTION

Functional Powder

The magnetic particles used in the functional powder of the present invention are not particularly restricted as long as they are made of magnetic substances. The magnetic substances are preferably materials exhibiting ferromagnetism at room temperature, but they by no means restrict embodiments of the present invention. Accordingly, any ferromagnetic material can be employed. Examples of the ferromagnetic material include iron, iron alloy, magnetite, ilmenite, pyrrhotite, magnesia ferrite, cobalt ferrite, nickel ferrite, and barium ferrite. Among them, ferrites having excellent stability in water are preferred because they can achieve the object of the present invention effectively. For example, magnetite ($Fe_3O_4$) is not only inexpensive but also stable in water, and further does not contain harmful elements. That is, hence, advantageously used for water treatment. The magnetic particles are generally in various shapes such as spheres, polyhedrons and irregular forms, but there is no particular restriction on the particle shapes. The sizes and shapes of the magnetic particles can be properly selected in consideration of production cost and other conditions. However, the shapes of the particles are preferably spheres or poly-hedrons having round corners. If the particles have sharp corners, they often damage covering polymer layers to make it difficult to keep the shapes of functional powder. The magnetic powder may be subjected to normal plating treatment such as Cu plating or Ni plating, if necessary.

In the present invention, the magnetic particles do not need to consist of only the magnetic substances. For example, they may comprise very fine magnetic powder combined with a resin binder. Further, the magnetic particles may be subjected to surface treatment for the purpose of, for example, anti-corrosion. It is only required of the magnetic particles that the resultant functional powder contain enough magnetic substances to be collected and recovered by use of magnetic force in the water treatment described later.

The mean size of the magnetic particles is normally 0.1 to 20 μm, preferably 0.2 to 5 μm. If the mean particle size is smaller than 0.1 μm, the particles in a magnetic field may undergo too weak magnetic force to be collected and recovered. On the other hand, however, if it is larger than 20 μm, the particles may have such small specific surface areas as to lower efficiency of recovering the impurities. In the present invention, the mean particle size can be determined by laser diffraction. For example, it can be measured by means of a SALD-DS21 type measurement unit ([trademark], manufactured by Shimadzu Corp.). Further, it can be also determined by other measurements such as X-ray diffraction and transmission electron microscopy (TEM).

Any method can be adopted to load hydrophobic or hydrophilic groups on the surfaces of the magnetic particles. However, if the hydrophobic or hydrophilic groups are released from the particles when the functional powder is dispersed in raw water, the raw water may be contaminated. Those groups are, therefore, preferably combined with the surfaces of the magnetic particles chemically so as not to be released. Here, the "hydrophobic groups" means groups having high affinity for organic compounds. Examples of the hydrophobic groups include aliphatic groups and aromatic groups. The "hydrophilic groups" means groups having high affinity for water. Preferred examples of the hydrophilic groups include hydroxyl and carboxyl.

In the case where the magnetic particles consist of only the magnetic substances such as magnetite, oxygen atoms of the oxide are positioned on the surfaces. Accordingly, the surfaces can be properly treated to load hydroxyls so that they can readily react with organic compounds having the hydrophobic or hydrophilic groups. Examples of the treatment applied to the surfaces of the magnetic particles include washing with organic solvents such as ethanol, UV washing, and plasma treatment.

On the other hand, in the case where the magnetic particles comprise very fine magnetic powder combined with a resin binder, functional groups reactable with the organic substances can be beforehand introduced into the binder so that the hydrophobic or hydrophilic groups can be chemically combined with the magnetic particles.

Further, the surfaces of the magnetic particles can be treated with a coupling agent. In this method, first the coupling agent is reacted and chemically combined with the surfaces. Thereafter, the organic substances having the hydrophobic or hydrophilic groups are reacted with the coupling agent combined with the surfaces. This method is preferred because the hydrophobic groups and the hydrophilic groups can be enough firmly fixed on the surfaces of the magnetic particles to protect the raw water from the reverse contamination.

In the case where the coupling agent is used for loading the hydrophobic groups and the hydrophilic groups on the surfaces of the magnetic particles, the surfaces are preferably treated previously, for example, by washing to form hydroxyls thereon before the coupling agent is reacted, as described above. The treatment applied to the surfaces for forming hydroxyls thereon is preferably washing with alcohol because it is simple and easy to perform.

In consideration of reactivity and bonding strength to the surfaces of the magnetic particles, the coupling agent is preferably a silane coupling agent containing alkoxysilyl groups. Further, in consideration of reactivity to the organic substances having the hydrophobic or hydrophilic groups, the silane coupling agent preferably contains functional groups reactable with the organic substances. Examples of the functional groups reactable with the organic substances include amino groups, amine groups, hydroxyl, and carboxyl. Examples of the silane coupling agent containing amino groups or amine groups include 3-aminopropyltriethoxysilane, N-2-aminoethyl-3-aminopropylmethyldimethoxysilane, N-2-aminoethyl-3-aminopropyltrimethoxysilane, N-2-aminoethyl-3-aminopropyltriethoxysilane, 3-aminopropyltrimethoxysilane, 3-triethoxysilyl-N-(1,3-dimetyl-butylidene)propylamine, and N-phenyl-3-aminopropyltrimethoxysilane. Among them, 3-aminopropyltriethoxysilane is particularly preferred.

Generally for the purpose of providing the hydrophobic groups and the hydrophilic groups on the surfaces of the magnetic particles, organic compounds having the hydrophobic groups and ones having the hydrophilic groups, respectively, are independently made to react with the surfaces. Although hydroxyls directly formed on the surfaces by the above treatment such as washing can be used as the hydrophilic groups, they are liable to be oxidized. Accordingly, it is preferred to load the hydrophobic or hydrophilic groups on the surfaces by use of the coupling agent. It is particularly preferred that the surfaces of the magnetic particles be modified by the steps of: providing reactive groups on the surfaces by the coupling agent; reacting a part of the reactive groups with the organic compounds having the hydrophobic groups, to load the hydrophobic groups; and then reacting the rest of the reactive groups with the organic compounds having the hydrophilic groups, to load the hydrophilic groups. In concrete, for example, first the surfaces of the magnetic particles are treated with the silane coupling agent containing amino groups so as to provide the amino groups (namely, reactive groups) thereon. Thereafter, a part of the amino groups are reacted to combine ionically with carboxylic acids having hydrocarbon chains (namely, hydrophobic groups), and then the rest of the amino groups are reacted with polyols or the like having hydroxyls (namely, hydrophilic groups). Thus, both the hydrophobic groups and the hydrophilic groups can be provided on the surfaces of the magnetic particles.

The carboxylic acids usable for introducing the hydrophobic groups are, for example, saturated aliphatic carboxylic acids, unsaturated aliphatic carboxylic acids, and aromatic carboxylic acids. Examples of the saturated aliphatic carboxylic acids include: monocarboxylic acids such as acetic acid, propionic acid, butanoic acid, pentanoic acid, hexanoic acid, heptanoic acid, octanoic acid, nonanoic acid, decanoic acid, tetradecanoic acid, pentadecanoic acid, hexadecanoic acid, heptadecanoic acid, octadecanoic acid, nonadecanoic acid, icosanoic acid, docosanoic acid, tetradocosanoic acid, hexadocosanoic acid and octadocosanoic acid; dicarboxylic acids such as oxalic acid, malonic acid, succinic acid, glutaric acid, adipic acid, pimelic acid, suberic acid, azelaic acid and sebacic acid; and polymeric carboxylic acids such as polymethacrylic acid and polyacrylic acid. If the carboxylic acid has two or more carboxyls, it is presumed that each carboxyl reacts with amino group and consequently that the carboxylic acid is combined with the amino group at each terminal.

Examples of the unsaturated aliphatic carboxylic acids include 9-hexadecenoic acid, cis-9-octadecenoic acid, cis, cis-9,12-octadecadienoic acid, 9,12,15-octadecatrienoic acid, 6,9,12-octadecatrienoic acid, 9,11,13-octadecatrienoic acid, 8,11-icosadienoic acid, 5,8,11-icosatrienoic acid, 5,8,11-icosatetraenoic acid, and cis-15-tetradocosanoic acid.

Examples of the aromatic carboxylic acids include: monocarboxylic acids such benzoic acid, methylbenzoic acid, xylylic acid, prehnitylic acid, γ-isodurylic acid, β-isodurylic acid, α-isodurylic acid, α-toluic acid, hydrocinamic acid, salicylic acid, o-, m- or p-anisic acid, 1-naphthalenecarboxylic acid, 2-naphthalenecarboxylic acid and 9-anthracenecarboxylic acid; dicarboxylic acids such as phthalic acid, isophthalic acid and terephthalic acid; and polycarboxylic acids such as hemimellitic acid, trimellitic acid, trimesic acid, mellophanic acid, prehnitic acid and pyromellitic acid.

The hydrophobic groups are, for example, aliphatic groups containing 8 or more, preferably 10 or more carbon atoms or otherwise aromatic groups containing 6 or more, preferably 8 or more carbon atoms. However, even if the hydrophobic groups provided on the surfaces of the magnetic particles contain a small number of carbon atoms, it is possible to obtain the effect of the present invention. In that case, the ratio M/N is so controlled that the hydrophobic groups containing a small number of carbon atoms are loaded in a relatively large amount. Here, the number of carbon atoms contained in the aliphatic or aromatic groups includes carbon atoms in carboxyls.

Examples of the organic compounds usable for introducing the hydrophilic groups include: polyols such as ethylene glycol, polyethylene glycol, polypropylene glycol, and glycerin; and oxy acids such as glycolic acid, lactic acid, glyceric acid, and tartaric acid. If those compounds for introducing the hydrophilic groups contain a large number of carbon atoms, they are less hydrophilic. Accordingly, they preferably contain a small number of carbon atoms based on the number of hydroxyls or carboxyls.

The coupling agents may contain hydroxyls instead of amino groups. In that case, some of the hydroxyls are made to react with halogenated hydrocarbons having hydrophobic hydrocarbon groups, and thereby the hydrophilic groups and the hydrophobic groups can be provided on the surfaces of the magnetic particles. The hydroxyls not reacted with the halogenated hydrocarbons are left on the surface of the resultant functional powder, and can function as the hydrophilic groups.

As described above, in the functional powder according to the present invention, the hydrophilic groups and the hydrophobic groups are provided on the surfaces of the magnetic particles. It is necessary that the number M of the hydrophobic groups and the number N of the hydrophilic groups satisfy the condition of $0.2<M/N<0.8$, preferably $0.3<M/N<0.6$. This condition ensures both the adsorbability to impurities (oils) and the dispersion stability in water. If the M/N is too large, the dispersion stability in water is liable to be lowered although the adsorbability to oils is enhanced. In contrast, if the M/N is too small, the adsorbability to oils is liable to be lowered although the dispersion stability in water is enhanced. Accordingly, for example, in the case where the functional powder has a small mean particle size, the dispersability thereof is relatively high as compared with a powder having a large mean particle size and, therefore, the number of hydrophobic groups may be increased to enhance the adsorbability. The numbers of the hydrophobic and hydrophilic groups may be determined either in total in the whole functional power or per unit of the surface area. The ratio M/N can be also estimated from the amounts of the coupling agent reacted with the magnetic particles and of the compound having the hydrophobic groups reacted thereafter.

Water Treatment Method

The water treatment method according to the present invention is used for separating impurities from raw water containing them. Here, the "impurities" means substances that are contained in water to treat and that must be removed so as to reuse the water. Further, in the present specification, organic substances to separate from raw water are referred to as "impurities" for the sake of convenience, but they may be collected for reuse.

In the present invention, organic substances such as oils in raw water are adsorbed with the hydrophobic groups provided on the surface of the functional powder. Accordingly, the water treatment method of the present invention is suitable for purifying water containing organic impurities, particularly, oils. Here, the "oils" means oils and fats that are generally liquid at room temperature, that are only slightly soluble in water, that have relatively high viscosities and that have specific gravities lower than water. They are, for example, animal and vegetable fats and oils, hydrocarbons, and aromatic oils. Representative examples of them include fatty acid glycerides, petroleum and higher alcohols. Those oils are characterized by functional groups contained therein, and hence it is preferred to select polymers preparing the functional powder in accordance with the functional groups.

In the water treatment method according to the present invention, first the aforementioned functional powder is dispersed in raw water containing the impurities described above. The functional powder has hydrophobic groups loaded on its surface, and the hydrophobic groups have affinity to the impurities. Accordingly, the impurities are adsorbed on the functional powder. The functional powder of the present invention exhibits very high adsorption ratio although the ratio depends on the concentration of the impurities and the amount of the powder. If a sufficient amount of the functional powder are used, the impurities are adsorbed in an amount of generally 80% or more, preferably 97% or more, more preferably 98% or more, most preferably 99% or more.

After the impurities are adsorbed, the functional powder is then collected and recovered to remove the impurities from the water. In this step, magnetic force is used to collect the powder. Since the cores of the functional powder are magnetic particles, they are attracted by magnetic force and thereby the functional powder can be easily collected and recovered. In combination with the magnetic force, sedimentation by gravity or centrifugal force in a cyclone can be used to remove/separate the powder from the water. The separation in this combination improves workability and hence makes it possible to recover the impurities more rapidly.

There is no particular restriction on the water to treat. The water treatment method according to the present invention can be practically applied to industrial wastewater, sewage, and domestic wastewater. There is also no particular restriction on the concentration of impurities in the water. However, if the impurities are too thickly contained, it is necessary to use a large amount of the functional powder. Accordingly, in that case, it is preferred to lower the concentration of impurities previously by another method so that the functional powder can work effectively. The concentration of impurities is preferably 1% or less, more preferably 0.1% or less.

After the water treatment, the recovered functional powder can be reclaimed and reused. In order to reclaim the powder, it is necessary to remove the adsorbed impurities from the surface of the powder. For removing the impurities, the powder is preferably washed with solvents. The solvents preferably do not destroy the hydrophobic and hydrophilic groups on the particle surfaces but dissolve the impurities. Examples of the solvents include methanol, ethanol, n-propanol, iso-propanol, acetone, tetrahydrofuran, n-hexane, cyclohexane, and mixtures thereof. Further, other solvents can be also used according to the impurities and so on.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

EXAMPLES

The present invention is further explained by use of the following examples, but they by no means restrict the present invention.

Example 1

Magnetic particles (mean particle size: 10 μm) were prepared. First, the surfaces thereof were washed to form hydroxyls in the following manner. The magnetic particles were added in ethanol, and stirred at room temperature. The mixture was subjected to centrifugal separation at 5000 rpm for 3 minutes, and then the supernatant was removed. The precipitate was washed with ultra pure water three times, and dried at 100° C. for 30 minutes to remove water completely.

Secondly, the magnetic particles treated thus were reacted with 3-aminopropyltriethoxysilane in the following manner. To 3 g of the washed magnetic particles, 3-aminopropyltriethoxysilane was added in such an amount that half of the particle surfaces were covered. The reaction was then conducted at room temperature for 10 hours. After the reaction was completed, un-reacted 3-aminopropyltriethoxysilane was washed away with ethanol three times and then with ultra pure water three times.

The magnetic particles thus subjected to the surface treatment were observed by an IR measurement apparatus in accordance with the attenuated total refraction (ATR) method. As a result, the obtained spectrum exhibited the peaks attributed to Si—O (800 to 1100 cm$^{-1}$) and O—H (3500 to 3900 cm$^{-1}$).

Further, the peak attributed to C—H (2982 to 2822 cm$^{-1}$) given by 3-aminopropyltriethoxysilane was also observed in the IR spectrum, and therefore it was confirmed that amino groups were attached via silyl groups on the surfaces of the particles.

The obtained surface-treated magnetic particles were then dispersed in anhydrous tetrahydrofuran (THF), and then octanoic acid in excess was added therein and stirred for 2 hours. After the reaction was completed, un-reacted octanoic acid was washed away with THF three times and then with ultra pure water three times, to obtain particles having surfaces with which the carboxylic acid salt was combined via the coupling agent. Further, polyethylene glycol was reacted with the carboxylic acid to load hydrophilic groups to obtain a functional powder. The obtained functional powder had an M/N of 0.5.

The mean particle size of the obtained functional powder was determined by X-ray diffraction measurement and by transmission electron microscopy (TEM) measurement, and thereby found to be 10 μm in both measurements. It was also confirmed that the above surface modification gave no effect on the shapes of the particles.

In a 50 mL color comparison tube, 20 mL of water, 70 μL of oil and 0.1 g of the above-obtained functional powder were placed. The tube was shaken for 1 minute, so that the oil was adsorbed on the powder. The light transmittance of the sample was then measured at 600 nm to evaluate the dispersability in water. As a result, the light transmittance was found to be 10%, and thereby it was confirmed that the powder was evenly dispersed.

The functional powder was collected and removed from the color comparison tube by means of a magnet. Thereafter, 10 mL of alternative fluorocarbon solvent (H-997 [trademark], manufactured by Horiba, Ltd.) was added to abstract un-adsorbed oil, and then the concentration of the un-adsorbed oil was measured by an oil-content analyzer (OCMA-305 [trademark], manufactured by Horiba, Ltd.). As a result, the concentration of the un-adsorbed oil was found to be 5 ppm or less.

Example 2

The procedure of Example 1 was repeated except for replacing octanoic acid with decanoic acid, to synthesize and evaluate a functional powder.

Example 3

The procedure of Example 1 was repeated except for replacing octanoic acid with tetradecanoic acid, to synthesize and evaluate a functional powder.

Example 4

The procedure of Example 1 was repeated except for replacing octanoic acid with stearic acid, to synthesize and evaluate a functional powder.

Example 5

The procedure of Example 1 was repeated except for replacing octanoic acid with benzoic acid, to synthesize and evaluate a functional powder.

Example 6

The procedure of Example 1 was repeated except for replacing octanoic acid with 2-naphthalenecarboxylic acid, to synthesize and evaluate a functional powder.

Comparative Example 1

The procedure of Example 1 was repeated except for replacing octanoic acid with propionic acid, to synthesize and evaluate a functional powder. Propionic acid has three carbon atoms, and hence did not give the hydrophobic group claimed in the present invention.

Comparative Example 2

The procedure of Example 1 was repeated except for replacing octanoic acid with hexanoic acid, to synthesize and evaluate a functional powder. Hexanoic acid has six carbon atoms, and hence did not give the hydrophobic group claimed in the present invention Comparative Example 3

The treated magnetic particles were reacted with decanetriethoxysilane in the following manner. To 3 g of the washed magnetic particles, decanetriethoxysilane in excess was added and reacted at room temperature for 10 hours. After the reaction was completed, un-reacted decanetriethoxysilane was washed away with ethanol three times and then with ultra pure water three times. The obtained powder was evaluated in the same manner as in Example 1.

The results were as set forth in Table 1.

As a result, it was revealed that the obtained functional powders were excellent both in oil-adsorbability and in dispersability (in the case where carboxylic acids of 8 or more carbon atoms were used, namely, in Examples 1 to 4). In the case where aromatic carboxylic acids were used (namely, in Examples 5 and 6), it was also found that the functional powders were excellent both in oil-adsorbability and in dispersability.

However, if the carboxylic acids of 6 or less carbon atoms (in Comparative Examples 1 and 2) were used, the functional powders poorly adsorbed the oil although they were excellent in dispersability. In contrast, the powder modified with alkyl groups having no functional groups (in Comparative Example 3) was poor in dispersability although it was excellent in oil-adsorbability.

TABLE 1

|  | Concentration of un-adsorbed oil | Dispersability |
|---|---|---|
| Ex. 1 | less than 5 ppm | excellent |
| Ex. 2 | less than 5 ppm | excellent |
| Ex. 3 | less than 5 ppm | excellent |
| Ex. 4 | less than 5 ppm | excellent |
| Ex. 5 | 10 ppm | excellent |
| Ex. 6 | 8 ppm | excellent |
| Com. 1 | 1000 ppm | excellent |
| Com. 2 | 300 ppm | excellent |
| Com. 3 | less than 5 ppm | poor |

The invention claimed is:
1. A functional powder comprising;
magnetic particles, and hydrophobic groups and hydrophilic groups are provided on the surfaces of the magnetic particles independently of each other, wherein the number M of said hydrophobic groups and the number N of said hydrophilic groups satisfy the condition of $0.2<M/N<0.8$.

2. The functional powder according to claim 1, wherein said magnetic particles have a mean particle size of 0.1 to 20 μm.

3. The functional powder according to claim 1, wherein said hydrophobic groups have hydrocarbon groups.

4. The functional powder according to claim 1, wherein said hydrophilic groups are hydroxyls or carboxyls.

5. The functional powder according to claim 1, wherein said magnetic particles are obtained by a process in which the surfaces of magnetic particles are subjected to surface treatment with a coupling agent and thereafter made to react with at least one selected from the group consisting of organic compounds having the hydrophobic groups and organic compounds having the hydrophilic groups.

6. A water treatment method comprising:
dispersing the functional powder according to claim 1 in water containing impurities so that the impurities are adsorbed on the surface of the powder, and
removing the functional powder having adsorbed the impurities from the water by use of magnetic force.

7. The method according to claim 6, wherein said water containing impurities is industrial wastewater.

8. The method according to claim 6, wherein said functional powder having adsorbed the impurities are washed with at least one organic solvent selected from the group consisting of methanol, ethanol, n-propanol, iso-propanol, acetone, tetrahydrofuran, n-hexane, cyclohexane, and mixtures thereof, so that they are reclaimed and reused in the next water treatment.

9. A process of treating water comprising adding the functional powder of claim 1 to water or a composition comprising water.

10. The functional powder according to claim 1, wherein said magnetic particles are obtained by a process in which the surfaces of magnetic particles are subjected to surface treatment with a coupling agent and thereafter made to react independently with each of an organic compound having a hydrophobic group and an organic compound having a hydrophilic group so that the hydrophobic group and the hydrophilic group are located in separate locations on the surfaces of magnetic particles.

11. The functional powder according to claim 1, wherein said magnetic particles are obtained by a process in which the surfaces of magnetic particles are subjected to surface treatment with a coupling agent and thereafter made to react first with an organic compound having a hydrophobic group and then second with an organic compound having a hydrophilic group so that the hydrophobic group and the hydrophilic group are located in separate locations on the surfaces of magnetic particles.

12. The process of claim 5, wherein the coupling agent comprises at least one functional group selected from the group consisting of amino, amine, hydroxyl and carboxyl.

13. A process of forming the functional oxide powder of claim 1, said process comprising surface treating the surfaces of magnetic particles with a coupling agent, then reacting the surface treated surfaces with an organic compound having a hydrophobic group, and then with an organic compound having a hydrophilic group so that the hydrophobic group and the hydrophilic group are located in separate locations on the surfaces of magnetic particles.

14. A method of forming a magnetic particle by treating a surface of a magnetic particle with a coupling agent and reacting the treated surface independently with each of an organic compound having a hydrophobic group and an organic compound having a hydrophilic group so that the hydrophobic group and the hydrophilic group are located in separate locations on the surface of the magnetic particle.

15. A method of forming a magnetic particle comprising treating a surface of a magnetic particle with a coupling agent and reacting the treated surface first with an organic compound having a hydrophobic group and then second with an organic compound having a hydrophilic group so that the hydrophobic group and the hydrophilic group are located in separate locations on the surface of the magnetic particle.

* * * * *